United States Patent
Kim et al.

(10) Patent No.: US 7,155,556 B2
(45) Date of Patent: Dec. 26, 2006

(54) DEVICES AND METHODS FOR CONVERTING REMOTE DEVICE FORMATS TO HOST DEVICE FORMATS FOR ACCESS TO HOST ASSOCIATED RESOURCES

(75) Inventors: Young-Jun Kim, Kyungki-do (KR); Jin-Aeon Lee, Kyungki-do (KR); Yun-Tae Lee, Seoul (KR)

(73) Assignee: Samsung Electronics Co., Ltd. (KR)

( * ) Notice: Subject to any disclaimer, the term of this patent is extended or adjusted under 35 U.S.C. 154(b) by 241 days.

(21) Appl. No.: 10/883,943

(22) Filed: Jul. 2, 2004

(65) Prior Publication Data

US 2005/0010712 A1    Jan. 13, 2005

(30) Foreign Application Priority Data

Jul. 8, 2003    (KR) ............... 10-2003-0046112

(51) Int. Cl.
G06F 13/00    (2006.01)

(52) U.S. Cl. .................. 710/315; 710/110
(58) Field of Classification Search .............. None
See application file for complete search history.

(56) References Cited

U.S. PATENT DOCUMENTS

| | | | |
|---|---|---|---|
| 5,774,476 A | | 6/1998 | Pressly et al. ............ 714/726 |
| 5,845,107 A | * | 12/1998 | Fisch et al. ............ 710/315 |
| 6,105,119 A | | 8/2000 | Kerr et al. ............ 711/219 |
| 6,571,308 B1 | * | 5/2003 | Reiss et al. ............ 710/315 |
| 6,687,773 B1 | * | 2/2004 | Stewart et al. ............ 710/65 |
| 6,718,424 B1 | * | 4/2004 | Cruz ............ 710/315 |
| 6,895,447 B1 | * | 5/2005 | Brewer et al. ............ 710/11 |
| 2003/0046478 A1 | * | 3/2003 | Petry et al. ............ 711/5 |
| 2003/0067934 A1 | * | 4/2003 | Hooper et al. ............ 370/428 |
| 2003/0149826 A1 | * | 8/2003 | Kadota ............ 710/306 |
| 2006/0015673 A1 | * | 1/2006 | Morrow ............ 710/315 |

FOREIGN PATENT DOCUMENTS

| | | |
|---|---|---|
| JP | 2000-123059 | 4/2000 |
| JP | 2002318782 A * | 10/2002 |
| KR | 10-2000-0033265 | 6/2000 |
| KR | 10-2002-0042148 | 6/2002 |
| KR | 10-2003-0011242 A | 2/2003 |

OTHER PUBLICATIONS

Derwent patent abstract for KR 2002042148 A, publication date Jun. 5, 2002.*
Notice to File a Response/Amendment to the Examination Report for Korean patent application No. 10-2003-0046112 mailed on Jun. 27, 2005.

* cited by examiner

Primary Examiner—Glenn A. Auve
(74) Attorney, Agent, or Firm—Myers Bigel Sibley & Sajovec, P.A.

(57) ABSTRACT

A host integrated circuit device can include a host interface circuit that is configured to access a resource associated with the host integrated circuit device in a first device interface format based on a request from a remote integrated circuit device located outside the host integrated circuit device in a second device interface format.

17 Claims, 5 Drawing Sheets

DEVICES AND METHODS FOR CONVERTING REMOTE DEVICE FORMATS TO HOST DEVICE FORMATS FOR ACCESS TO HOST ASSOCIATED RESOURCES

CROSS-REFERENCE TO RELATED APPLICATION

This application claims the priority of Korean Patent Application No. 2003-46112, filed on Jul. 8, 2003, in the Korean Intellectual Property Office, the disclosure of which is incorporated herein in its entirety by reference.

FIELD OF THE INVENTION

The invention generally relates to integrated circuit devices, and more specifically, to interfaces of integrated circuit devices.

BACKGROUND

It is known to integrate two (or more) chips in one system for performing complex operations. For example, a modem chip and a separate application processor chip may each be included in a system. The microprocessor and the modem may each have associated SRAM, flash memory, SDRAM, etc. Accordingly, the two devices may each need respective dedicated interfaces to the SRAM, flash memory, SDRAM, etc., thereby increasing the cost of the system due to the dedicated SRAM, flash memory, SDRAM, devices for each.

In order to make one chip (e.g., a master chip) use resources of another chip (e.g., a slave chip), pins for bus protocol signals can be placed so as to be accessible outside the chip so that the bus protocol used inside the slave chip may be accessed from outside the slave chip. The bus protocol inside the chip may be designed only for a use inside the chip, such that the size of the address or data bus used therein is increased and the control signals may be more complicated. Thus, the number of pins used in the chip (the master chip) may increase. For example, the number of address pins needed from the master are in proportional to the memory size of the slave chip, and the same number of control pins as the number of control signals for the slave chip may also be needed. The increased number of pins may reduce the level of integration of a product, which may increase costs.

SUMMARY

Embodiments according to the invention can provide devices and methods for converting remote device formats to host device formats for access to host associated resources. Pursuant to these embodiments, a host integrated circuit device can include a host interface circuit that is configured to access a resource associated with the host integrated circuit device in a first device interface format based on a request from a remote integrated circuit device located outside the host integrated circuit device in a second device interface format.

Accordingly, some embodiments according to the invention may include an interface for providing external access to a bus protocol in a device (e.g., a slave) so that another device (e.g., a master) may make use of resources associated with the slave (a master chip), which may require that fewer pins be allocated by the master to use the resource of the slave. In addition, a plurality of the resources of the slave chip may be accessed utilizing a general-purpose interface of the master chip so that the master may access more than one type of resource using a single interface. Moreover, in some embodiments according to the invention, the resources may be inside or outside the slave device. In some embodiments according to the invention, some of the resources are inside the slave and other resources are outside the slave.

In some embodiments according to the invention, the first device interface format can be an Advanced Microcontroller Bus Architecture format and the second device interface format can be an SRAM, DRAM, FRAM, EEPROM, and/or MRAM format. In some embodiments according to the invention, the resource is located within the host integrated circuit device. In some embodiments according to the invention, the resource is located outside the host integrated circuit device.

In some embodiments according to the invention, the host interface circuit can include a first register set configured for read-only access by the remote integrated circuit device and a second register set configured for access responsive to a write or read access by the remote integrated circuit device to the resource.

In some embodiments according to the invention, the first register set can be a plurality of registers configured to store accessibility information associated with the resource used to determine whether a portion of the resource can be accessed by the remote integrated circuit device. In some embodiments according to the invention, the accessibility information can be power-save information indicating whether the portion is operating according to a power-save scheme.

In some embodiments according to the invention, the second register set can be a plurality of registers configured to store address information for combining with an address provided by the remote integrated circuit device in association with the read or write access. In some embodiments according to the invention, the information for combining with the address provided by the remote integrated circuit device can be an address pointer configured to be added to the address provided by the remote integrated circuit device to provide an access address that is used to access the resource during the read or write.

In some embodiments according to the invention, the information for combining with the address provided by the remote integrated circuit device can be an address pointer configured to select a base address from a base address conversion table for combining with the address provided by the remote integrated circuit device. In some embodiments according to the invention, the host interface circuit is further configured to access the resource in a burst mode wherein a plurality of locations associated with the resource are accessed responsive to the request.

In some embodiments according to the invention, a host integrated circuit device can include an address processor for determining whether an access thereto is made in a register access mode or a memory access mode based on an address from a master device to a slave device. A register mapping memory can be included for providing register values for accessing resources associated with the slave device. An address generator can be provided for generating an access address for accessing the resources based on a portion of an address received from the master device and an address register value in the register mapping memory. A local bus controller can be include for generating control signals to controlling a bus protocol associated with the slave device based on a control signal received from the master device and a control related register value in the register mapping memory.

In some method embodiments according to the invention, resources can be accessed by setting environmental register values for using resources of a second chip or controlling a bus protocol based on an address provided from a first chip. An access address can be generated for accessing the resources of the second chip using a portion of an address provided by the first chip and an address related register value included in the environmental register values. Control signals can be generated for controlling a bus protocol of the second chip using a control register value included in the environmental register values and a control signal of the first chip and the resource can be accessed using the access address and the control signals.

DETAILED DESCRIPTION OF EMBODIMENTS ACCORDING TO THE INVENTION

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "coupled to" another element, it can be directly coupled to the other element or intervening elements may be present. In contrast, when an element is referred to as being "directly coupled to" another element, there are no intervening elements present. Like numbers refer to like elements throughout. As used herein, the term "and/or" includes any and all combinations of one or more of the associated listed items.

It will be understood that, although the terms first, second, etc. may be used herein to describe various elements, components, and/or sections, these elements, components, and/or sections should not be limited by these terms. These terms are only used to distinguish one element, component, or section from another. Thus, a first element, component, or section described below could be termed a second element, component, or section without departing from the teachings of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Some embodiments according to the invention may include an interface for providing external access to a bus protocol in a device (e.g., a slave) so that another device (e.g., a master) may make use of resources associated with the slave (a master chip), which may require that fewer pins be allocated by the master to use the resource of the slave. In addition, a plurality of the resources of the slave chip may be accessed utilizing a general-purpose interface of the master chip so that the master may access more than one type of resource using a single interface. Moreover, in some embodiments according to the invention, the resources may be inside or outside the slave device. In some embodiments according to the invention, some of the resources are inside the slave and other resources are outside the slave.

Figure 1:
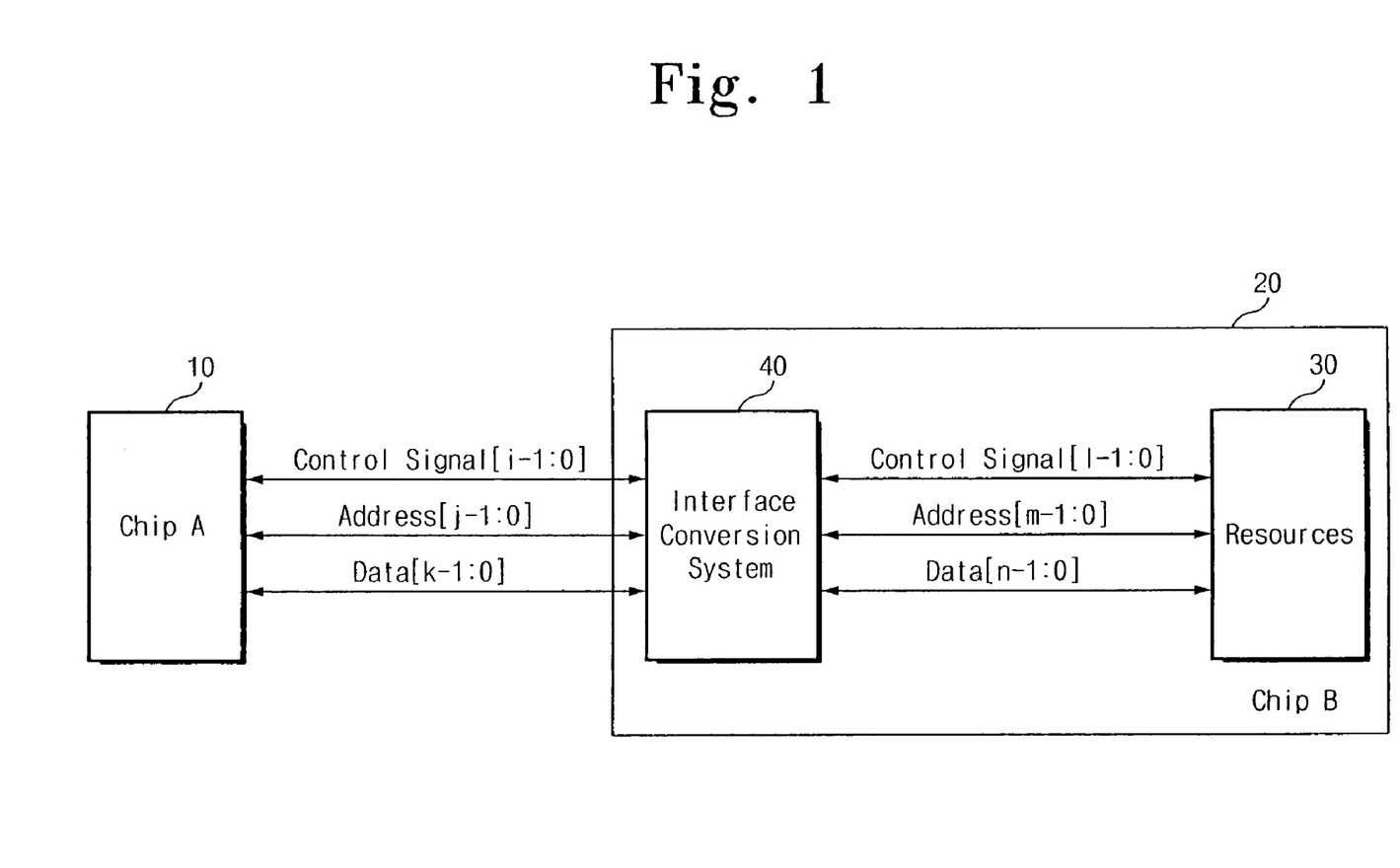
FIG. 1 is a block diagram illustrating host interface circuits according to some embodiments of the invention.

FIG. 1 is a block diagram illustrating interface circuits according to some embodiments of the invention. The host interface circuits according to some embodiments of the invention can convert a bus protocol of one chip (master chip) to a bus protocol of another chip (slave chip). In some embodiments according to the invention, the host interface circuit may be included in the slave chip. Referring to FIG. 1, a host interface circuit (or system) 40 is included in a chip B 20. The interface system 40 can convert a bus protocol of a chip A 10 into a bus protocol of the chip B 20, such that the chip A 10 can access the resources associated the chip B 20 via the bus protocol of the chip A 10.

For example, in some embodiments according to the invention, the chip A 10 is external to the chip B 20 and uses an interface including i-bit control signal, j-bit address and k-bit data. Meanwhile, the chip B 20 uses l-bit control signal, m-bit address and n-bit data (i+j+k≦l+m+n) to access resources 30. Therefore, in a conventional approach, the chip A 10 could require the number of pins needed to directly interface to the resource 30 using the specific protocol of the chip B 20. In contrast to such conventional approaches, however, in some embodiments according to the invention, the chip B 20 includes a built-in interface system 40 that may allow the resource 30 of the chip B 20 to be accessed using the protocol associated with the chip A 10 (i.e., without requiring the chip A 10 to include additional pins/signals to implement the protocol associated with the resources 30). In some embodiments according to the invention, the resources 30 may include various modules of the chip B 20, for example, a memory controller, an LCD controller, etc., that is, external/internal resources of the chip B 20.

Some embodiments of the interface conversion system 40 according to the invention use a control signal and an address of the chip A 10 (the master chip) to set various environmental register values in a register mapping region to make use of internal/external resources of the chip B (the slave chip) where the interface conversion system is built in. The interface conversion system 40 generates addresses for accessing the resources 30 of the slave chip and various control signals for controlling a bus of the slave chip based on the set of environmental register values associated with the resources 30 and the master chip. In some embodiments according to the invention, the various control signals for controlling a bus of the slave chip may be implemented using a state machine. The state machine can be implemented using techniques known to those skilled in the art.

Figure 2:
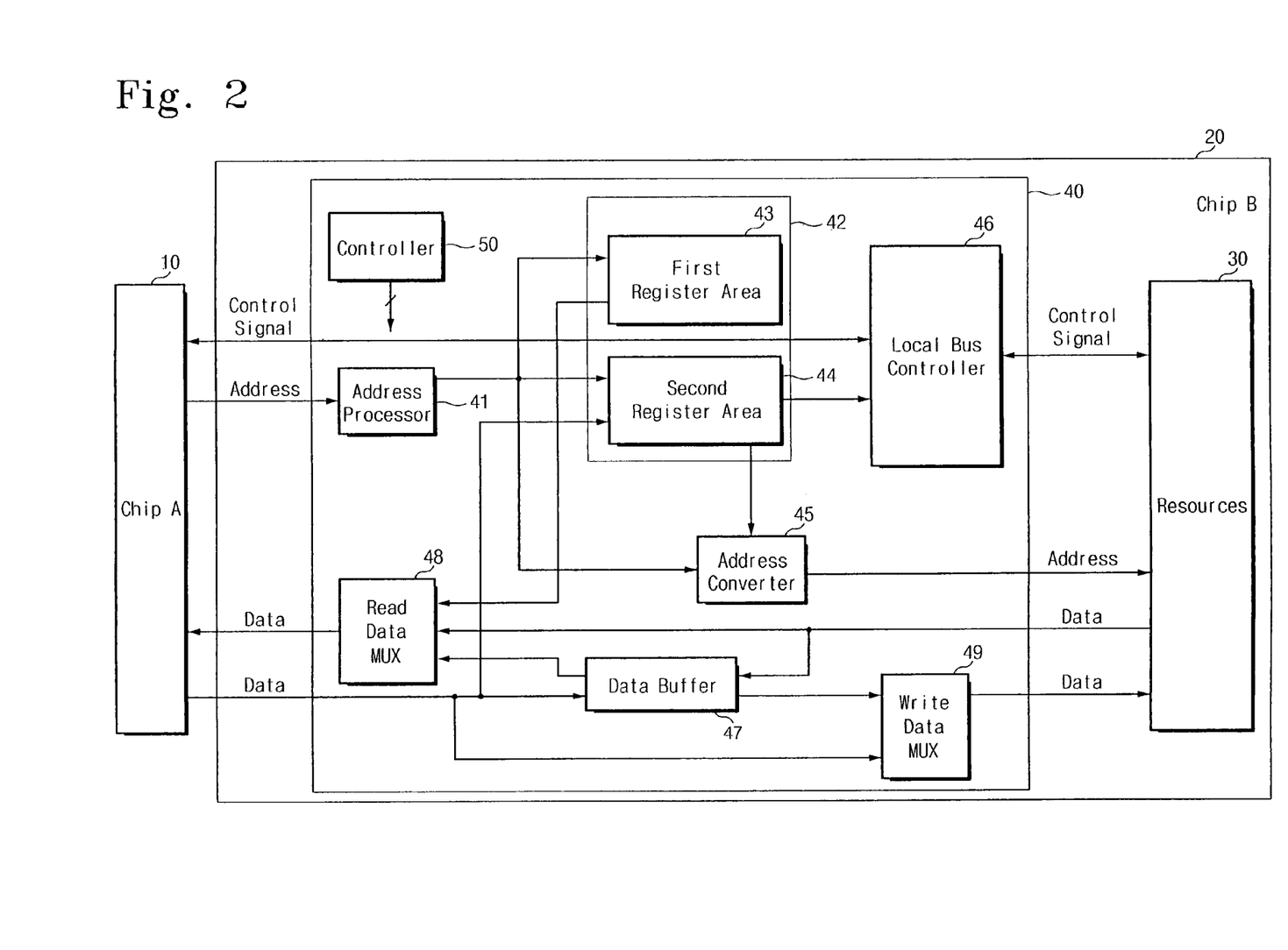
FIG. 2 is a detailed block diagram illustrating host interface circuits according to some embodiments of the invention.

Referring to FIG. 2, an interface conversion system 40 according to some embodiments of the invention is explained in greater detail. An internal module controller 50 of the interface conversion system 40 performs control operations. The interface conversion system 40 according to some embodiments of the invention serves as a bus master of the slave chip B 20, which can convert accesses according a bus protocol of the master chip A 10 to a bus protocol according to the slave chip B 20.

The interface conversion system 40 includes an address processor 41, a register mapping region 42, an address converter 45, a local bus controller 46 and a controller 50 for controlling each of these components. The address processor 41 receives an address (e.g., j-bit address) provided from the master chip A 10 and decodes it to determine whether the received address corresponds to either a register access mode or a memory access mode. The register access mode is used to access the register mapping region 42, whereas the memory access mode is for accessing a resource (e.g. a memory) of the chip B 20. For example, the address processor 41 may determine whether the access is a register access mode or a memory access mode based on an uppermost bit of the address provided by the master chip A 10. In some embodiments according to the invention, if the uppermost bit of the address is "1", the mode is a register access mode, whereas if the uppermost bit of the address is "0", the mode is a memory access mode.

The register mapping region 42 stores various environmental register values for using a resource of the chip B 20 in the register access mode. In some embodiments according to the invention, the register mapping region 42 comprises a first register region 43 and a second register region 44. In some embodiments according to the invention, The external master chip A 10 is capable of performing only read operations of the first register region 43 and write operations to the second register region 44. The external master chip A 10 accesses a first register region 43 and a second register region 44 of the register mapping region 42 using its own a specific external bus protocol.

The first register region 43 comprises registers for storing various state information with respect to resources 30 of the slave chip B 20. The second register region 44 comprises registers for storing register values and base addresses for generating various control signals for controlling a bus of the slave chip B 20 and a read/write. For example, the first register region 43 includes accessible module information, status field for notifying states of various resources for communication between the master chip A 10 and the slave chip B 20. In some embodiments according to the invention, the accessible module information indicates currently accessible resources among the resources of slave chip B 20, which can be used for making the master chip A 10 use only activated resources of the slave chip B when a portion of resources of the slave chip B20 is inactivated while, for example, operating in a power-save scheme. In some embodiments according to the invention, the accessible module information may be implemented in the form of a resource unit flag or an address map.

In some embodiments according to the invention, if the master chip A 10 uses only the known resources or, alternatively, if all the resources of the slave chip B 20 are always activated, the accessible module information may not be required (i.e., a first register region may not be required). The slave chip B 20 can update the accessible module information as the status of resources change.

In the memory access mode, the address converter 45 generates an access address to a specific region of the resource 30 of slave chip B 20 by using address related register values (a base address) provided from the second register area 44 and a portion of address provided from the master chip A 10. The base address is stored in the second register region 44 of the register mapping region 42. The portion of address provided from the master chip A 10 can provide the remainder of the address bits except an uppermost bit and hereinafter referred to as 'a local address'.

The local bus controller 46 generates various control signals for controlling a bus of the slave chip B 20 and read/write of data by using a control related register values in the second register region 44 and the control signal provided from the master chip A 10. For example, in case that the master chip A 10 uses an interface of the SRAM and the slave chip B 20 uses an Advanced Microcontroller Bus Architecture (AMBA) interface, the master chip A 10 generates a bus request signal HBUSREQX with respect to the slave chip B 20 from memory read control signals CSn (a chip selection signal) and OEn (an output enable signal) thereof, and generates various bus control signals such as HTRANS (transfer), HSIZE (a size of data), HBURST (a length of burst), etc. from a control related register values (e.g., information about the size of data and the length of burst) of the second resister area 44. In some embodiments according to the invention, these various control signals for a bus control and a data read/write operation of the slave chip can be implemented using a state machine. The state machine can be variously embodied according to a bus protocol of the slave chip and this is apparent to those skilled in the art.

In some embodiments according to the invention, the read data multiplexer 48 selects data from the first register region and the chip B 20, and transfers selected data to the chip A 10. In some embodiments according to the invention, the interface conversion system 40 further includes a data buffer 47. The data buffer 47 is a temporary storage for supporting a transfer of a large amount of data block between the external master chip A 10 and the internal slave chip B 20. The data buffer 47 may be configured to a suitable size for a resource accessed by a unit of page such as a NAND flash memory, and for resources requiring a large amount of burst transfer to have high-performance.

In some embodiments according to the invention, in a case of a block transfer, the data read from the slave chip B 20 is temporarily stored in a data buffer 47. In some embodiments according to the invention, the read data multiplexer 48 selects data stored in the data buffer 47, data from the slave chip B 20 and data from the first register region 43, and transfers the selected data to the master chip A 10.

Similarly, in some embodiments according to the invention, when a large amount of data block is written in the slave chip B 20 from the master chip A 10, the data can be stored into the data buffer 47 first. The write data multiplexer 49 selects the data stored in the data buffer 47 and the data directly provided from the master chip A 10, and transfers the selected data to the slave chip B 20.

Address register values used to access the resources associated with the slave chip B 20, such as base addresses, data transfer register values and control signal generating register values, etc. are stored in the second register region 44.

In some embodiments according to the invention, the address register values may be determined as follows. The base address may be the value in a base address conversion table referenced by a base address pointer that is provided by the master chip A during an access to the resources associated therewith. Alternatively, a register value stored in a specific address of the second register region 44 or a value shifted from the same may be used as the base address. The base address can be used as a portion of the address with respect to the resource of the slave chip B 20. The remainder of the address can be provided by the master chip A 10. That is, a final access address for the resources of the slave chip B 20 can be generated by combining the base address pointer (or base address in the base address conversion table) with the address provided by the master chip A 10.

Figure 3A:
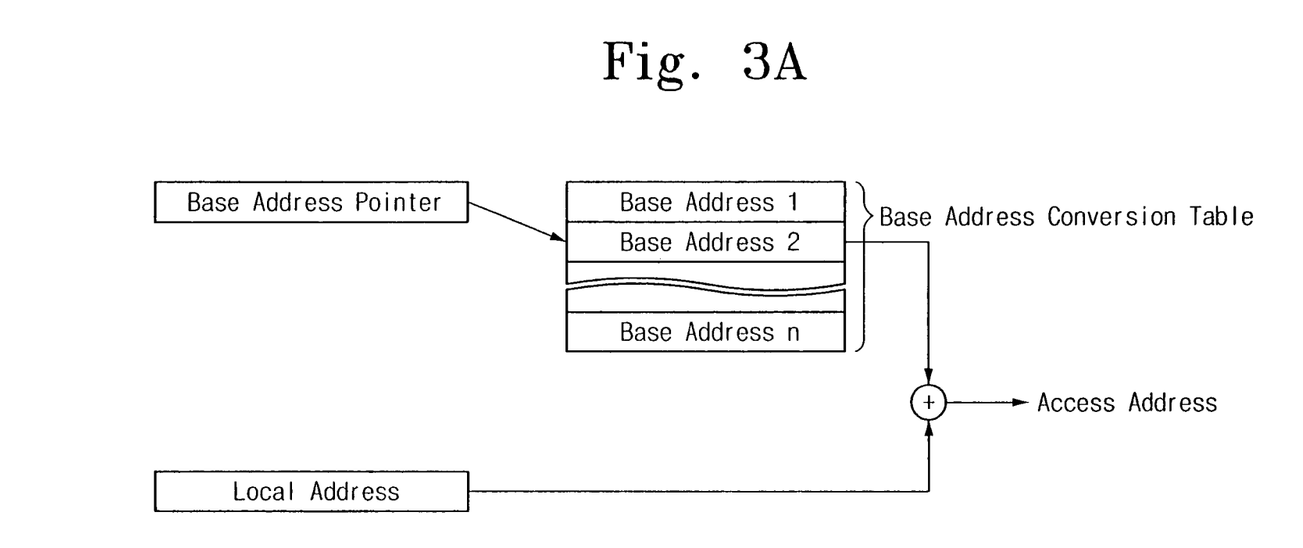
FIGS. 3A and 3B are block diagrams illustrating host interface circuits according to some embodiments of the invention.
Figure 3B:
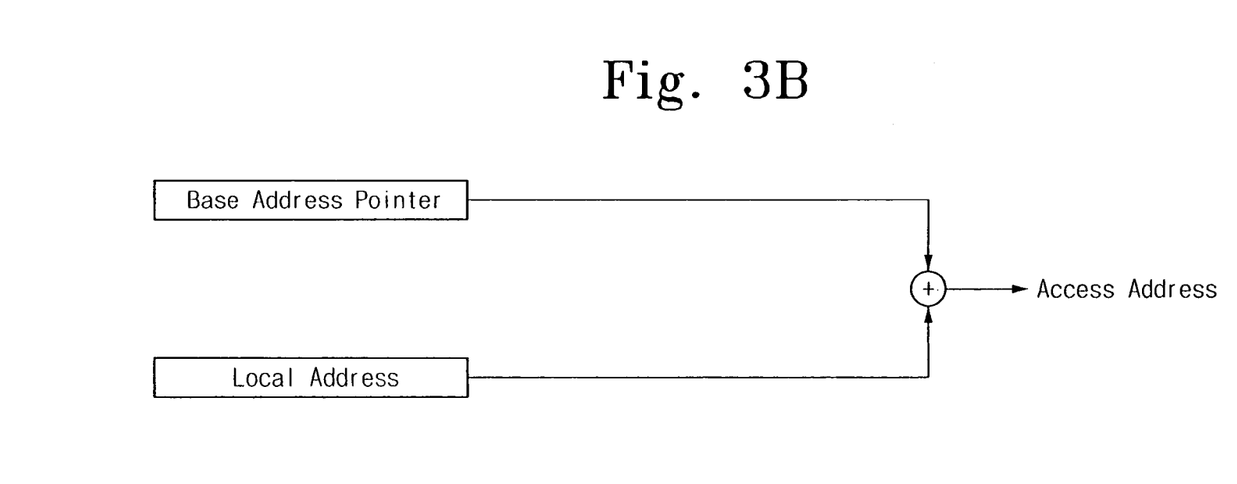

Referring to FIGS. 3A and 3B, methods of generating an access address according to some embodiments of the invention are described in further detail. In some embodiments according to the invention, (as shown in FIG. 3A) the base address conversion table is used to provide an access address whereas FIG. 3B illustrates some embodiments according to the invention which do not use the base address conversion table.

In some embodiments according to the invention, if an address space of the master chip A 10 is larger than that of the slave chip B 20, the base address conversion table may be used as illustrated in FIG. 3A. That is, the base address pointer references one entry of the address conversion table. Therefore, the address converters 45 generates an access address from a base address stored in a specific address of the address conversion table indicated by an address pointer of the second register region 44 and a local address provided from the master chip A 10.

In some embodiments according to the invention, a base address pointer may be used as a base address as illustrated in FIG. 3B. That is, the address converter 45 may generate an access address from a local address provided from the master chip A 10 and a base address pointer stored in the second register region 44.

In some embodiments according to the invention, the register values relating to a data transfer and a control signal generation may relate to a size of data, a length of burst, data buffer enable flag, block read start, block write transfer, and the like. The local bus controller 46 generates a bus protocol signal and synchronizes a busy/ready between the master chip A 10 and the slave chip B 20 or a timing.

Figure 4A:
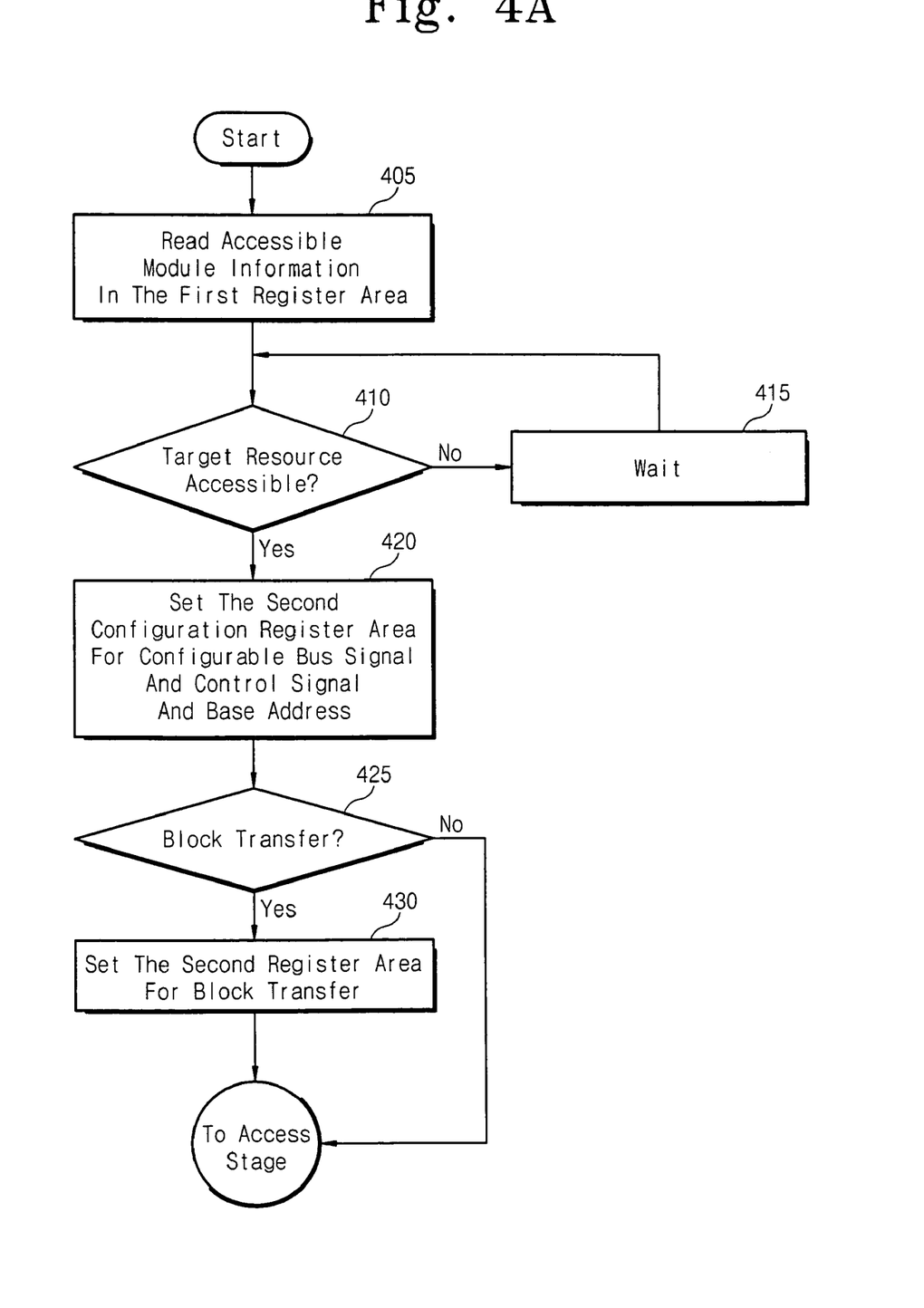
FIGS. 4A and 4B are flowcharts illustrating operations of host interface circuits according to some embodiments of the invention.
Figure 4B:
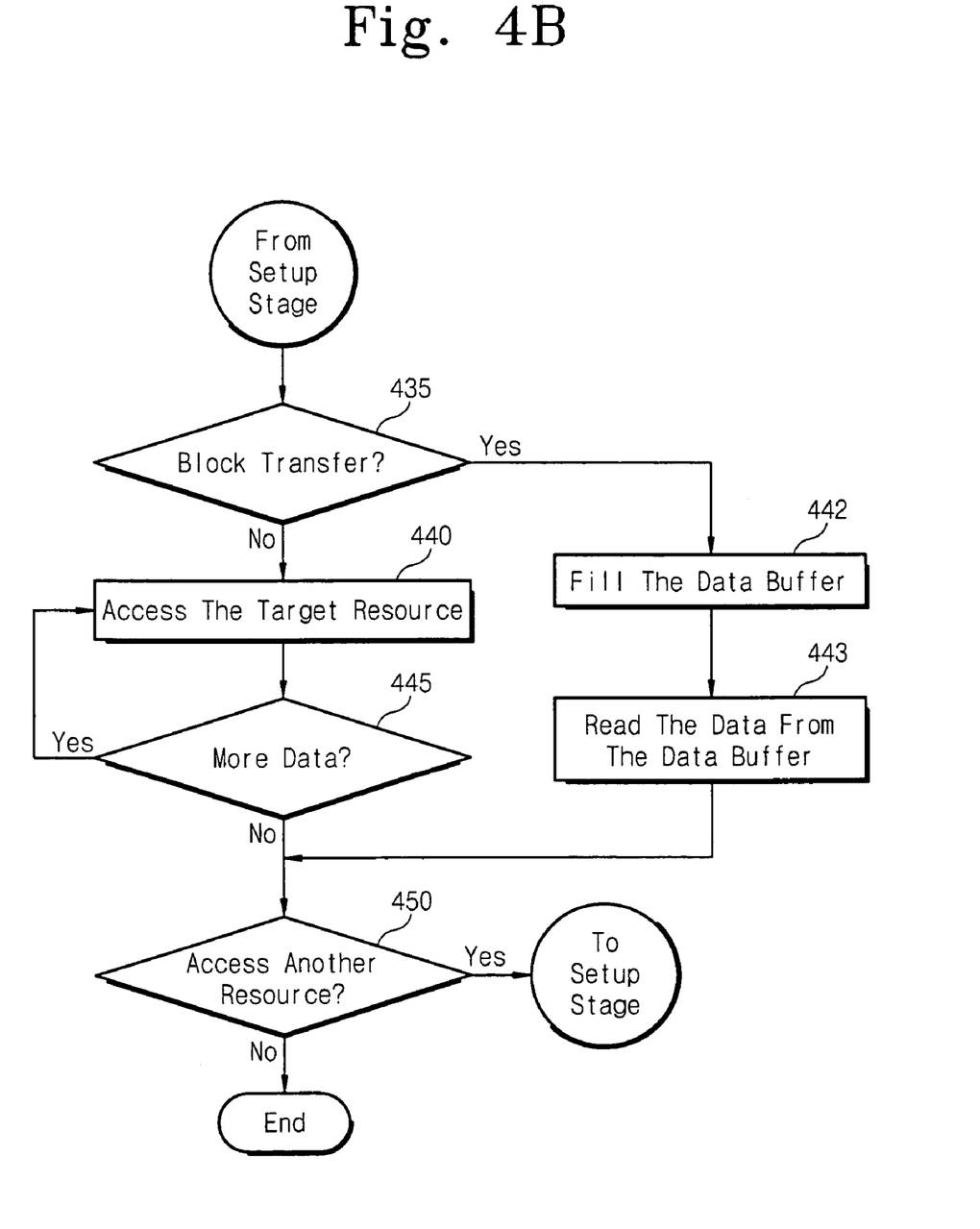

Referring to FIGS. 4A, 4B and 2, operations of host interface circuits according to some embodiments of the invention are described further below. In particular, FIG. 4A is a flowchart illustrating operations of host interface circuits according to some embodiments of the invention including providing access to resources associated with a slave chip. FIG. 4B is a flowchart illustrating operations of host interface circuits according to some embodiments of the invention including accessing resources associated with the slave chip, such as during a read operation directed to resources associated with the slave chip B 20.

Referring to FIG. 4A, the master chip A 10 reads accessible module information (or accessibility information) for a target resource stored in the first register region 43 by using its memory read interface (block 405). In some embodiments according to the invention, if the target resource of the slave chip B 20 is determined to be accessible (block 410) based on the accessible module information, various register values, a base address, etc. are written to the second register region 44 (block 20). If the target resource is determined not to be accessible (block 410), the master chip A 10 waits until the target resource is in the accessible state (block 415).

Whether the target resource is accessed in a type of block transfer or not is determined (block 425). If the block transfer is used to access the target resource, various register values relating to the block transfer are written in the second register region 44 (block 430) and the access to the resource may begin as outlined in FIG. 4B. Otherwise, if the block transfer is not used (block 425), the access begins as outlined in FIG. 4B.

Referring to FIG. 4B, in some embodiments according to the invention, the access to resource can begin by determining if the block transfer is used. If block transfer is used (block 435) data is read from the slave chip B 20 and stored in a data buffer 47 (block 442). In this case, using the register values in the second register region 44 (block 420 of FIG. 4A) a signal for controlling a bus of the slave chip B 20 is generated. The start address of the block transfer is generated using the base address and the local address and the data block is transferred from the slave chip B 20 to the data buffer 47. The master chip A 10 reads the data stored in the data buffer 47 by means of the specific bus protocol thereof (block 443). If another resource is to be accessed, the process can begin again (block 405 of FIG. 4A).

In some embodiments according to the invention, if the block transfer is not used (block 435), the master chip A 10 accesses a targeted resource of the slave chip B 20 to read data from the resource without using the data buffer 47 (block 440). In some embodiments according to the invention, however, the master chip A 10 may read data from the resource through the data buffer 47.

The targeted resource is accessed by generating the targeted address by means of the local address provided by the master chip A 10 and the base address set in the second register region 44, and by generating control signals on the basis of various register values stored in the second register region. In some embodiments according to the invention, if resources corresponding to the same base address (e.g., another resource in an identical memory module) are to be accessed (block 445), the steps outlined in FIG. 4A may be avoided and a target address generated by a new local address from the master chip and the pre-existing base address in the second register area 44. If further resources are to be accessed (block 450), the process may begin.

Data transfer from the slave chip B 20 to the master chip A 10, is described above in reference to a read access to the resource. In some embodiments according to the invention, a write data transfer may be performed similarly. In particular, in some embodiments according to the invention, after providing access to the resource as outlined above in reference to FIG. 4A, an access address is generated with respect to a resource of the slave chip B 20, and various control signals relating to a write operation are generated to write a data in the slave chip B 20.

In some exemplary embodiments according to the invention, where the external master chip A 10 uses an SRAM interface and a slave chip B 20 uses an Advanced Microcontroller Bus Architecture (AMBA) interface to the resource, the host interface circuit according to some embodiments of the invention can include the signals A[10:0]:11 bit address, D[7:0]:8 bit data, OEn: output enable, WEn: write enable, WAITn: waiting signal (waiting in case that the slave chip B 20 is busy), INTn: an interrupt signal for notifying a block transfer, and CSn: a chip selection signal. Other signals may be included in the interface.

In some exemplary embodiments according to the invention, the slave chip B 20 having the resource accessed via the AMBA interface can include the signals: HADDR[31:0]:32 bit address, HWDATA[31:0]:32 bit write data, HRDATA [31:0]:32 bit read data, HREADY: ready signal, HRESP[1:0]:2 bit transfer response signal, HBURSEQX: a bus request for bus master, HGRANTx: a bus grant from an arbiter, HTRANTS [1:0]: a type of current transfer, HLOCKx: bus lock, HSIZE[2:0]: size of data, HBURST [3:0]: length of burst, HPROT [3:0]: protection, and HWRITE: write enable. Other signals can be included In some embodiments according to the invention, a memory access (or register access) mode may be determined according to an uppermost one-bit of the 11 bit address of the master chip A 10, whereas the other 10 bits are provided by the local address. Because the master chip A 10 provides a 10-bit local address, a 22-bit address among the 32-bit address of the slave chip B 20 is stored in the second register region 44 of the register mapping region 42. Therefore, the address is stored in an 8-bit unit and the registers for storing three base addresses can include a base address register 0, a base address register 1 and a base address register 2. The targeted address is determined by shifting the 22-bit base address to left by 10 positions and adding the 10-bit local address to provide the 32 bit access address.

In some embodiments according to the invention, registers for storing information relating to data transfer exist in the second register region. The stored information related to data transfer comprises, for example, a size of data, a length of burst, data buffer enable flag, block read transfer start, block write transfer start, etc.

The size of these registers in the second register area are the same as that of data in the external master chip A 10, that is 8 bits. In some exemplary embodiments according to the invention, 8-bit data is read from the slave chip B 20, the master chip A 10 reads accessible module information stored in the first register region 43 to identify whether or not the resource of the slave chip B 20 (e.g., a memory) is accessible. If it is accessible, the master chip A 10 sets a size of data 8 bits and a length of burst 1 in the second register region 44.

The master chip A 10 writes 8 bits, 8 bits and 6 bits into base address registers 0~2 of the second register region 44 of the second register region 44 respectively. The master chip A 10 performs a read operation to the slave chip B 20 using a bus interface thereof. In this case, the local bus controller 46 generates a signal HBUSREQx signal for performing a bus request of the slave chip B 20 using control signals CSn and Oen relating to the read operation provided by the master chip A 10. The local bus controller 46 sends a signal WAITn to the master chip A 10 to wait until the access is ended. If a bus arbiter sends a grant signal HGRANTx for permitting the signal HBUSREQx to use a bus, the local bus controller 46 generates control signals such as HTRANS, HSIZE, HLOCKx, HPROT, HBURST, etc. referring to the values set in the second register region 44.

The address converter 45 generates an access address (32 bits) to the resource of the slave chip B 20 using the local address (10 bits) provided through an address processor 41 and a base address 22 bits stored in the base address registers of the second register region 44. The data stored in a memory of the slave chip B 20 is read by the access address provided from the address converter 45 and various bus control signals provided from the local bus controller 46. When the read operation is completed, the signal WAITn becomes a ready state, such that the master chip A 10 may read data. If there are additional data in the region having identical base address is needed after reading of 8-bit data, the master chip A 10 can omit the step of setting various register values with respect to the second register region 44.

In some embodiments according to the invention, a block transfer used (such as embodiments where 1 Kb of data is read from a memory of the slave chip B 20 using a block transfer). The master chip A 10 reads accessible module information stored in the first register region 43 to identify whether the memory of the slave chip B 20 is accessible or not. If it is accessible, the master chip A 10 sets the size of data 32 bits and the length of burst 128 in the second register region 44 (32 bits=4 bytes, 4*128=512 bytes). To indicate the memory address to access, 8 bits, 8 bits, 6 bits are written in the base address registers 0~2. The register values relating to a block transfer such as data buffer enable flag, block read transfer start bit are set. A local bus controller 46 generates a signal HBUSREQx for requesting a bus by dividing the amount written in the burst length register by a maximum length of burst provided by AMBA or a predetermined length of burst.

When the bus arbiter deliver the grant signal HGRANTx for permitting an access of bus, the local bus controller 46 generates control signals such as HTRANS, HSIZE, HLOCKx, HPROT, HBURST, etc. referring to the values of the second register regions 44. The value read from the memory of the slave chip B 20 is stored in the data buffer 47. If the amount of the predetermined block data is entirely transferred, the operation is stopped. If all the data transfer is ended, the interrupt signal INTn is generated. Therefore, the master chip A 10 may identify that the data is delivered to the data buffer 47, and the master chip A 10 may read data in the data buffer 47 serially using the bus protocol itself if it starts to read when the data buffer enable flag is set.

In some embodiments according to the invention, a block transfer used (such as embodiments where 1 Kb of data is written to a memory of the slave chip B 20 using a block transfer). A master chip A 10 reads an accessible module information stored in a first register region 43 to identify whether the memory of the slave chip B 20 is accessible or not. If it is accessible, the size of data is set 32 bits and the length of burst is set to 128 in the second register region 44 (32 bits=4 bytes, 4*128=512 bytes). To indicate a memory address to access, 8 bits, 8 bits and 6 bits of base addresses are written in the base address registers 0~2. The data buffer enable flag is set and the master chip A 10 performs a write operation by 8-bits 1024 times to write 1 Kb data in the data buffer 47 using the protocol itself.

If the 1 Kb data is entirely written in the data buffer 47, a block write transfer start bit is set. The local bus controller 46 divides the length of burst in a register by a maximum length of burst supplied by AMBA or a predetermined length of burst to generate a signal HBUSREQx. This enables data process when a data buffer is larger than the length of the burst supplied by the AMBA or prevents from occupying bus because of too long length of burst. If the bus arbiter sends the grant signal HGRANTx for permitting access of the bus arbiter, the local bus controller 46 generates control signals such as HTRANS, HSIZE, HLOCKx, HPROT, HBURST, etc. referring to the values of the second register region 44. The values of the data buffer 47 are sequentially written in the appropriate memory location. If the determined block data is entirely transferred, the operation is stopped. In this case, an interrupt is generated through a pin INTn.

As described herein, some embodiments according to the invention may include an interface for providing external access to a bus protocol in a device (e.g., a slave) so that another device (e.g., a master) may make use of resources associated with the slave (a master chip), which may require that fewer pins be allocated by the master to use the resource of the slave. In addition, a plurality of the resources of the slave chip may be accessed utilizing a general-purpose interface of the master chip so that the master may access more than one type of resource using a single interface. Moreover, in some embodiments according to the invention, the resources may be inside or outside the slave device. In some embodiments according to the invention, some of the resources are inside the slave and other resources are outside the slave.

Many alterations and modifications may be made by those having ordinary skill in the art, given the benefit of present disclosure, without departing from the spirit and scope of the invention. Therefore, it must be understood that the illustrated embodiments have been set forth only for the purposes of example, and that it should not be taken as limiting the invention as defined by the following claims. The following claims are, therefore, to be read to include not only the combination of elements which are literally set forth but all equivalent elements for performing substantially the same function in substantially the same way to obtain substantially the same result. The claims are thus to be understood to include what is specifically illustrated and described above, what is conceptually equivalent, and also what incorporates the essential idea of the invention.

What is claimed:

1. A host integrated circuit device comprising:
    a host interface circuit configured to access a resource associated with the host integrated circuit device in a first device interface format based on a request from a remote integrated circuit device located outside the host integrated circuit device in a second device interface format; and
    a first register set configured for read-only access by the remote integrated circuit device; and
    a second register set configured for access responsive to a write or read access by the remote integrated circuit device to the resource.

2. A host integrated circuit device according to claim 1 wherein the first and second device interface formats are incompatible with one another.

3. A host integrated circuit device according to claim 1 wherein the first device interface format comprises an Advanced Microcontroller Bus Architecture format and the second device interface format comprises an SRAM, DRAM, FRAM, EEPROM, and/or MRAM format.

4. A host integrated circuit device according to claim 1 wherein the resource is located within the host integrated circuit device.

5. A host integrated circuit device according to claim 1 wherein the resource is located outside the host integrated circuit device.

6. A host integrated circuit device according to claim 1 wherein the first register set comprises a plurality of registers configured to store accessibility information associated with the resource used to determine whether a portion of the resource can be accessed by the remote integrated circuit device.

7. A host integrated circuit device according to claim 6 wherein the accessibility information comprises power-save information indicating whether the portion is operating according to a power-save scheme.

8. A host integrated circuit device according to claim 1 wherein the second register set comprises a plurality of registers configured to store address information for combining with an address provided by the remote integrated circuit device in association with the read or write access.

9. A host integrated circuit device according to claim 8 wherein the information for combining with the address provided by the remote integrated circuit device comprises an address pointer configured to be added to the address provided by the remote integrated circuit device to provide an access address that is used to access the resource during the read or write.

10. A host integrated circuit device according to claim 8 wherein the information for combining with the address provided by the remote integrated circuit device comprises an address pointer configured to select a base address from a base address conversion table for combining with the address provided by the remote integrated circuit device.

11. A host integrated circuit device according to claim 1 wherein the host interface circuit is further configured to access the resource in a burst mode wherein a plurality of locations associated with the resource are accessed responsive to the request.

12. A host integrated circuit device comprising:
    an address processor for determining whether an access thereto is made in a register access mode or a memory access mode based on an address from a master device to a slave device;
    a register mapping memory for providing register values for accessing resources associated with the slave device;
    an address generator for generating an access address for the resources based on a portion of an address received from the master device and an address register value in the register mapping memory; and
    a local bus controller for generating control signals to controlling a bus protocol associated with the slave device based on a control signal received from the master device and a control related register value in the register mapping memory.

13. A device according to claim 12 wherein the register mapping memory includes a first register region for storing state information associated with the resources and a second register region for storing information for using the resources.

14. A device according top claim 13 further comprising:
    a read data multiplexer for selecting read data stored in a data buffer accessed from the resource and transferring the data to the master device; and
    a write data multiplexer for selecting write data provided from the data buffer and transferring the selected write data to the resource.

15. A device according to claim 12 wherein the master device directly accesses the register mapping region using an external bus protocol associated with the master device.

16. A method of accessing resources comprising:
    setting environmental register values for using resources of a second chip or controlling a bus protocol based on an address provided from a first chip;
    generating an access address for accessing the resources of the second chip using a portion of an address provided by the first chip and an address related register value included in the environmental register values;
    generating control signals for controlling a bus protocol of the second chip using a control register value included in the environmental register values and a control signal of the first chip; and
    accessing the resource using the access address and the control signals.

17. A method according to claim 16 further comprising:
    checking whether the resources of the second chip are accessible before setting the environmental register values.

* * * * *